US00RE50764E

(19) United States
(12) Reissued Patent
Morris et al.

(10) Patent Number: US RE50,764 E
(45) Date of Reissued Patent: Jan. 27, 2026

(54) SWITCH GEAR TRANSPORT THAT DISTRIBUTES ELECTRIC POWER FOR FRACTURING OPERATIONS

(71) Applicant: Typhon Technology Solutions (U.S.), LLC, The Woodlands, TX (US)

(72) Inventors: Jeffrey G. Morris, The Woodlands, TX (US); Adrian Benjamin Bodishbaugh, The Woodlands, TX (US)

(73) Assignee: Typhon Technology Solutions (U.S.), LLC, The Woodlands, TX (US)

(21) Appl. No.: 18/650,516

(22) Filed: Apr. 30, 2024

Related U.S. Patent Documents

Reissue of:
(64) Patent No.: 11,359,462
Issued: Jun. 14, 2022
Appl. No.: 16/521,460
Filed: Jul. 24, 2019

U.S. Applications:
(60) Provisional application No. 62/713,393, filed on Aug. 1, 2018.

(51) Int. Cl.
*E21B 43/26* (2006.01)
*E21B 41/00* (2006.01)
(Continued)

(52) U.S. Cl.
CPC ..... *E21B 41/00* (2013.01); *E21B 43/2607* (2020.05); *H02B 5/00* (2013.01); *H02J 9/00* (2013.01)

(58) Field of Classification Search
CPC ..... E21B 41/00; E21B 43/2607; H02B 5/00; H02J 9/00
See application file for complete search history.

(56) References Cited

U.S. PATENT DOCUMENTS 5,512,811 A 4/1996 Latos et al.
8,882,336 B1 11/2014 Wolford
(Continued)

FOREIGN PATENT DOCUMENTS

AR 092923 A1 5/2015
AR 104823 A2 8/2017
(Continued)

OTHER PUBLICATIONS

United States Office Action, U.S. Appl. No. 16/521,460, filed Sep. 29, 2021, six pages.
(Continued)

*Primary Examiner* — Joshua Kading
(74) *Attorney, Agent, or Firm* — Fenwick & West LLP

(57) ABSTRACT

A system and a method for distributing electric power from a power source of electricity to power fracturing operations includes a plurality of circuit breakers, each circuit breaker including a first circuit breaker connector and a second circuit breaker connector, each of which outputs electric power to a corresponding transport at a first voltage level, a power source connector that receives electric power from a power source of electricity at the first voltage level, and a black start generator that generates electric power at a second voltage level and that supplies the generated electric power to start the power source of electricity.

37 Claims, 5 Drawing Sheets

(51) Int. Cl.
*H02B 5/00* (2006.01)
*H02J 9/00* (2006.01)

(56) References Cited

U.S. PATENT DOCUMENTS

| | | | | |
|---|---|---|---|---|
| 9,121,257 | B2 | 9/2015 | Coli et al. | |
| 9,140,110 | B2 | 9/2015 | Coli et al. | |
| 9,410,410 | B2 | 8/2016 | Broussard et al. | |
| 9,452,394 | B2 | 9/2016 | Weinstein et al. | |
| 9,475,020 | B2 | 10/2016 | Coli et al. | |
| 9,475,021 | B2 | 10/2016 | Coli et al. | |
| 9,534,473 | B2 | 1/2017 | Morris et al. | |
| 9,562,420 | B2 | 2/2017 | Morris et al. | |
| 10,107,084 | B2 | 10/2018 | Coli et al. | |
| 10,107,085 | B2 | 10/2018 | Coli et al. | |
| 10,221,668 | B2 | 3/2019 | Coli et al. | |
| 10,227,855 | B2 | 3/2019 | Coli et al. | |
| 10,378,326 | B2 * | 8/2019 | Morris | F04B 17/06 |
| 10,415,332 | B2 * | 9/2019 | Morris | F01L 15/10 |
| 10,502,042 | B2 * | 12/2019 | Coli | F04B 1/16 |
| 10,519,730 | B2 * | 12/2019 | Morris | F04B 17/03 |
| 10,648,312 | B2 | 5/2020 | Coli et al. | |
| 10,689,961 | B2 | 6/2020 | Coli et al. | |
| 10,718,194 | B2 | 7/2020 | Coli et al. | |
| 10,724,353 | B2 * | 7/2020 | Coli | E21B 43/26 |
| 10,774,630 | B2 | 9/2020 | Coli et al. | |
| 10,794,165 | B2 * | 10/2020 | Fischer | H02B 1/52 |
| 10,837,270 | B2 | 11/2020 | Coli et al. | |
| 10,851,634 | B2 | 12/2020 | Coli et al. | |
| 10,876,386 | B2 | 12/2020 | Coli et al. | |
| 10,895,138 | B2 | 1/2021 | Coli et al. | |
| 2004/0104577 | A1 | 6/2004 | Alger et al. | |
| 2007/0132243 | A1 | 6/2007 | Wurtele et al. | |
| 2009/0308602 | A1 | 12/2009 | Bruins et al. | |
| 2010/0141232 | A1 | 6/2010 | Efraimsson et al. | |
| 2011/0175579 | A1 | 7/2011 | Mazumdar | |
| 2013/0150268 | A1 | 6/2013 | Oldham | |
| 2014/0096974 | A1 | 4/2014 | Coli et al. | |
| 2014/0238683 | A1 | 8/2014 | Korach et al. | |
| 2014/0255214 | A1 | 9/2014 | Burnette | |
| 2015/0036453 | A1 | 2/2015 | Wolford | |
| 2015/0068724 | A1 | 3/2015 | Coli et al. | |
| 2015/0114652 | A1 | 4/2015 | Lestz et al. | |
| 2015/0300145 | A1 | 10/2015 | Coli et al. | |
| 2015/0314255 | A1 | 11/2015 | Coli et al. | |
| 2016/0177675 | A1 | 6/2016 | Morris et al. | |
| 2016/0177678 | A1 | 6/2016 | Morris et al. | |
| 2016/0208593 | A1 | 7/2016 | Coli et al. | |
| 2016/0208594 | A1 | 7/2016 | Coli et al. | |
| 2016/0273328 | A1 | 9/2016 | Oehring | |
| 2016/0326855 | A1 | 11/2016 | Coli et al. | |
| 2016/0348479 | A1 | 12/2016 | Oehring et al. | |
| 2016/0369609 | A1 | 12/2016 | Morris et al. | |
| 2017/0028368 | A1 | 2/2017 | Oehring et al. | |
| 2017/0036178 | A1 | 2/2017 | Coli et al. | |
| 2017/0037718 | A1 | 2/2017 | Coli et al. | |
| 2017/0104389 | A1 | 4/2017 | Morris et al. | |
| 2017/0218843 | A1 | 8/2017 | Oehring et al. | |
| 2017/0222409 | A1 | 8/2017 | Oehring et al. | |
| 2017/0259227 | A1 | 9/2017 | Morris et al. | |
| 2017/0302135 | A1 | 10/2017 | Cory | |
| 2018/0156210 | A1 | 6/2018 | Oehring et al. | |
| 2018/0363434 | A1 | 12/2018 | Coli et al. | |
| 2018/0363435 | A1 | 12/2018 | Coli et al. | |
| 2018/0363436 | A1 | 12/2018 | Coli et al. | |
| 2018/0363437 | A1 | 12/2018 | Coli et al. | |
| 2018/0363438 | A1 | 12/2018 | Coli et al. | |
| 2018/0374607 | A1 | 12/2018 | Hernandez et al. | |
| 2019/0055827 | A1 | 2/2019 | Coli et al. | |
| 2019/0112908 | A1 | 4/2019 | Coli et al. | |
| 2019/0169971 | A1 | 6/2019 | Oehring et al. | |
| 2019/0204021 | A1 * | 7/2019 | Morris | F28F 27/00 |
| 2019/0211661 | A1 | 7/2019 | Reckels et al. | |
| 2019/0271218 | A1 | 9/2019 | Coli et al. | |
| 2019/0277125 | A1 | 9/2019 | Coli et al. | |
| 2019/0277126 | A1 | 9/2019 | Coli et al. | |
| 2019/0277127 | A1 | 9/2019 | Coli et al. | |
| 2019/0277128 | A1 | 9/2019 | Coli et al. | |
| 2020/0040878 | A1 * | 2/2020 | Morris | F04B 17/05 |
| 2020/0109616 | A1 * | 4/2020 | Oehring | B01D 46/003 |
| 2020/0109617 | A1 * | 4/2020 | Oehring | F04B 15/02 |
| 2020/0208565 | A1 * | 7/2020 | Morris | E21B 43/26 |
| 2020/0318467 | A1 | 10/2020 | Coli et al. | |
| 2020/0347710 | A1 | 11/2020 | Coli et al. | |
| 2020/0347711 | A1 | 11/2020 | Coli et al. | |

FOREIGN PATENT DOCUMENTS

| | | | |
|---|---|---|---|
| AR | 104824 | A2 | 8/2017 |
| AR | 104826 | A2 | 8/2017 |
| AR | 087298 | A1 | 12/2017 |
| CA | 2773843 | A | 10/2012 |
| CA | 2773843 | A1 | 10/2012 |
| CA | 2835904 | A1 | 10/2012 |
| CA | 2845347 | A1 | 10/2012 |
| CA | 2900387 | A1 | 10/2012 |
| CA | 2955706 | A1 | 10/2012 |
| CA | 2845347 | C | 6/2017 |
| CA | 2900387 | C | 9/2018 |
| EP | 3444430 | A1 | 2/2019 |
| EP | 3444431 | A1 | 2/2019 |
| EP | 3444432 | A1 | 2/2019 |
| EP | 3447239 | A1 | 2/2019 |
| EP | 3453827 | A2 | 3/2019 |
| EP | 3456915 | A1 | 3/2019 |
| MX | 358054 | B | 8/2018 |
| MX | 362628 | B | 1/2019 |
| MX | 365888 | B | 6/2019 |
| MX | 365889 | B | 6/2019 |
| MX | 366049 | B | 6/2019 |
| WO | 2012137068 | A2 | 10/2012 |
| WO | 2014053056 | A1 | 4/2014 |
| WO | 2018071738 | A1 | 4/2018 |

OTHER PUBLICATIONS

United States Office Action, U.S. Appl. No. 16/521,460, filed Mar. 12, 2021, ten pages.

United States Office Action, U.S. Appl. No. 16/521,460, filed Oct. 29, 2020, ten pages.

English translation of Office Action issued in the prosecution of application AR087298 B1 dated Dec. 29, 2017, 5 pages.

Int'l Search Report received in copending PCT Application No. PCT/US2019/043303 dated Nov. 12, 2019, 13 pages.

PCT Int'l Search Report filed in copending PCT Application No. PCT/US2018/039976 dated Nov. 5, 2018, 12 pages.

PCT Int'l Search Report filed in copending PCT Application No. PCT/US2018/039982 dated Sep. 11, 2018, 8 pages.

204US00 English translation of Office Action issued in the prosecution of application AR087298 B1 dated Dec. 29, 2017, 5 pages.

MX362628 Espacenet English Abstract, Publication Date of Jan. 29, 2019, 1 page.

MX365888 Espacenet English abstract, Publication date of Jun. 19, 2019, 1 page.

MX365889 Espacenet English Abstract, Publication Date of Jun. 19, 2019, 1 page.

MX366049B Espacenet English Abstract, Publication Date of Jun. 26, 2019, 1 page.

* cited by examiner

SWITCH GEAR TRANSPORT THAT DISTRIBUTES ELECTRIC POWER FOR FRACTURING OPERATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is an application to reissue U.S. Pat. No. 11,359,462, which issued Jun. 14, 2022 from U.S. application Ser. No. 16/521,460 filed Jul. 24, 2019, which* claims the benefit of U.S. Prov. Appl. No. 62/713,393 filed 1 Aug. 2018, which is incorporated herein by reference *in their entirety*.

BACKGROUND

Hydraulic fracturing has been commonly used by the oil and gas industry to stimulate production of hydrocarbon producing wells, such as oil and/or gas wells. Hydraulic fracturing, sometimes called "fracing" or "fracking" is the process of injecting fracturing fluid into a wellbore to fracture the subsurface geological formations and release hydrocarbons. The fracturing fluid is pumped into a wellbore at a pressure sufficient to cause fissures within the underground geological formations. Once inside the wellbore, the fracturing fluid fractures the underground formation. The fracturing fluid may include water, various chemical additives, and proppants that promote the extraction of the hydrocarbon reserves, such as oil and/or gas. Proppants, such as fracturing sand, prevent fissures and fractures in the underground formation from closing; thereby, allowing the formation to remain open so that hydrocarbons flow through the hydrocarbon wells.

Implementing fracturing operations at well sites requires extensive investment in equipment, labor, and fuel. A typical fracturing operation uses fracturing equipment, personnel to operate and maintain the fracturing equipment, large amounts of fuel to power the fracturing operations, and relatively large volumes of fracturing fluids. As such, planning for fracturing operations is complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing the environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein, and it is not intended to identify key or critical elements of the invention or to delineate the scope of the invention. Its sole purpose is to present concepts in a simplified form as a prelude to the more detailed description that is discussed later.

In one embodiment, a switch gear transport is provided which comprises: a plurality of circuit breakers, wherein each circuit breaker includes a first circuit breaker connector and a second circuit breaker connector, wherein each of the first circuit breaker connector and the second circuit breaker connector is configured to output electric power to a corresponding transport at a first voltage level; a power source connector that is configured to receive electric power from a power source of electricity at the first voltage level; and a black start generator that generates electric power at a second voltage level and that is configured to supply the generated electric power at the second voltage level to start a power source of electricity In another embodiment, an electric fracturing system powered by a power source of electricity is provided which comprises: a switch gear transport that is configured to: (i) electrically connect to the power source of electricity, (ii) receive electric power from the power source of electricity at a first voltage level, and (iii) provide the received electric power to one or more transports at the first voltage level; a fracturing pump transport that is electrically connected to the switch gear transport via an electrical cable and that receives the electric power at the first voltage level via the electrical cable; and a circuit breaker connector that is disposed on the switch gear transport and that supplies the electric power at the first voltage level to the fracturing pump transport via the electrical cable, wherein the fracturing pump transport comprises a transformer that steps down the electric power received at the first voltage level to at least one lower voltage level.

In yet another embodiment, a method for distributing electric power from a mobile source of electricity to power fracturing operations is provided which comprises: receiving, at a transport, electric power from the mobile source of electricity at a first voltage level, wherein the first voltage level falls within a range of 1,000 V to 35 kilovolts; supplying, from the transport, the electric power to a fracturing pump transport at the first voltage level using only a first, single cable connection; and supplying, from the transport, the electric power to a second transport at the first voltage level using only a second, single cable connection.

In yet another embodiment, each of the above described embodiments and variations thereof, may be implemented as a method, apparatus, and/or system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
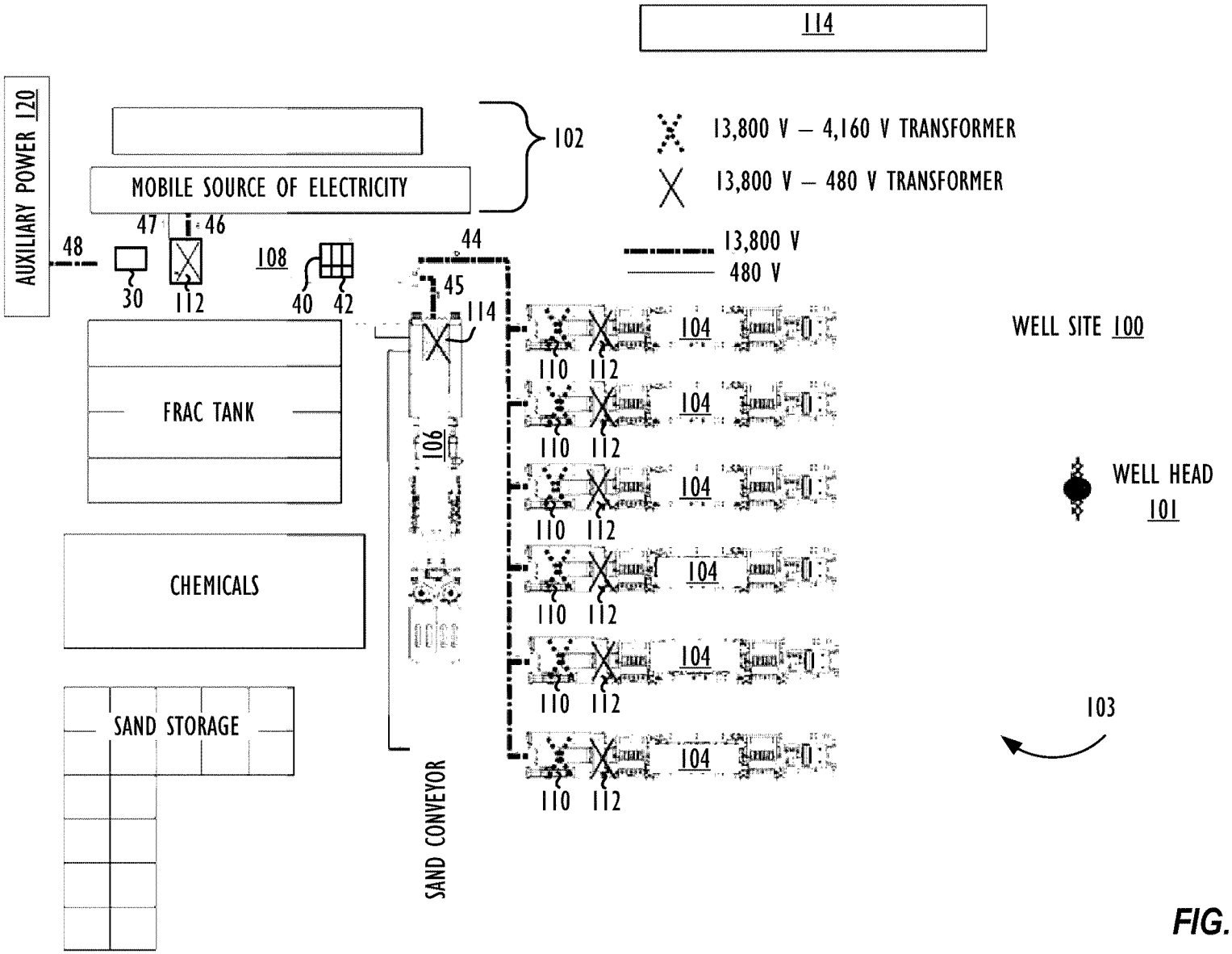
FIG. 1 is a schematic diagram of an embodiment of a medium voltage power distribution system for a fracturing fleet located at well site.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

As used herein, the term "transport" refers to any transportation assembly, including, but not limited to, a trailer, truck, skid, rail car, and/or barge used to transport relatively heavy structures and/or other types of articles, such as fracturing equipment and fracturing sand. A transport could be independently movable from another transport. For example, a first transport can be mounted or connected to a motorized vehicle that independently moves the first transport while an unconnected second transport remains stationary.

As used herein, the term "trailer" refers to a transportation assembly used to transport relatively heavy structures and/or other types of articles (such as fracturing equipment and fracturing sand) that can be attached and/or detached from a transportation vehicle used to pull or tow the trailer. As an example, the transportation vehicle is able to independently move and tow a first trailer while an unconnected second trailer remains stationary. In one or more embodiments, the trailer includes mounts and manifold systems to connect the trailer to other fracturing equipment within a fracturing fleet or fleet. The term "lay-down trailer" refers to a specific embodiment of a trailer that includes two sections with different vertical heights. One of the sections or the upper section is positioned at or above the trailer axles and another section or the lower section is positioned at or below the trailer axles. In one embodiment, the main trailer beams of the lay-down trailer may be resting on the ground when in operational mode and/or when uncoupled from a transportation vehicle, such as a tractor.

As used herein, the term "low voltage" refers to a voltage range from about 50 volts (V) to 1,000 V for alternating current (AC) electric power. The term "medium voltage" refers to a voltage range from about 1,000 V to about 35 kilovolts (kV) for AC electric power, and the term "high voltage" refers to a voltage range greater than 35 kV for AC electric power. Although the terms "low voltage," "medium voltage," and "high voltage" generally refer to voltage ranges in AC electric power, the disclosure is not limited to AC electric power and could also utilize current (DC) voltage.

Unless otherwise specified within the disclosure, the term "electrical connection" refers to connecting one transport to another transport using one or more electrical cables. The term "electrical cable" can be interchanged throughout this disclosure with the term "power cable" "power cable connection," "cable connection," or "electrical cable connection." The terms "electrical cable," "power cable" "power cable connection," "cable connection," and "electrical cable connection" refer to a single cable assembly that bundles together one or more wires (e.g., copper wires) that carry AC or DC electric current to provide electric power. In one or more embodiments, the single cable assembly also includes other wire types, such as fiber optic wires that perform other functions besides providing electric power. For example, the fiber optic wires are able to carry light for the purposes of transferring communication signals.

Various example embodiments are disclosed herein that distribute electric power using a switch gear transport to power one or more fracturing fleets. For example, FIG. 1 is a schematic diagram of an embodiment of a medium voltage power distribution system for a fracturing fleet 103 located at well site 100. As shown in the present example, the system includes a switch gear transport 108 in electrical communication with one or more power sources of electricity 102, 120, such as mobile source 102 via a first connection 46 and an auxiliary source 120 via a second connection 48. In turn, the switch gear transport 108 is in electrical communication with one or more power consumers, such as fracturing pump transports 104 via connections 44 and a blender-hydration transport 106 via connection 45.

The switch gear transport 108 may include a black start generator 30 that provides electric power to initiate and start at least one of the one or more power sources of electricity. Once the power sources of electricity are operational, the switch gear transport 108 receives electric power from the power sources 102, 120 of electricity at a designated input voltage level and outputs the electric power to the power consumers. In one or more embodiments, the designated input voltage level is a relatively high medium voltage level, such as 13.8 kilovolts (kV). (Although the voltage and current levels referenced in FIG. 1 generally refer to AC electric power, other embodiments could have the fracturing fleet 103 adapted to be powered using DC electric power.) The switch gear transport 108 maintains the input voltage level when outputting electric power to one or more transports, such as fracturing pump transports 104 and a hydration-blender transport 106.

To output and provide electric power, each circuit breaker 40 includes a circuit breaker connector 42 that connects to a transport (e.g., fracturing pump transport) using a single electrical cable 44. For example, a circuit breaker connector 42 may connect to a fracturing pump transport 104 using a single electrical cable 44 that supplies electric power at a target output voltage level of about 13.8 kV. To provide additional redundancy and/or to power additional fracturing fleets, each circuit breaker 40 could include more than one circuit breaker connector 42. When the transports 104, 106 receive the electric power at the target output voltage level, each of the transports 104, 106 include one or more transformers 110, 112, 114 that step down the target output voltage level (e.g., 13.8 kV). The transformers 110, 112, 114 are able step down the target output voltage level to one or more lower voltage levels that fracturing equipment (e.g., electric prime movers) mounted on the transports 104, 108 may utilize. As an example, a transformer 110, 112 mounted on the fracturing pump transport is able to step down electric power received at the target output voltage level (e.g., 13.8 kV) to lower voltage levels (e.g., 4.2 kV, 2.1 kV, 600 volts (V), 480 V, 240 V, and 120 V).

As shown in FIG. 1, the power source of electricity 102 provides power by connecting to the switch gear transport 108 using six medium voltage (e.g., 13.8 kV) cable connections 44. In one or more embodiments, the power source of electricity 102 includes one or more turbine-electric generator transports that compress and mix combustion air with hydrocarbon fuel to spin and generate mechanical energy and then converts the mechanical energy to electricity. The power source of electricity 102 could also include an inlet and exhaust transport that provides ventilation and combustion air to the turbine-electric generator transport when generating electricity. Configuring and utilizing a turbine-electric generator transport and an inlet and exhaust transport are discussed and shown in more detail in U.S. Pat. No. 9,534,473, filed Dec. 16, 2015 by Jeffrey G. Morris et al. and entitled "Mobile Electric Power Generation for Hydration Fracturing of Subsurface Geological Formations," which is hereby incorporated by reference as if reproduced in its entirety. In other embodiments, the power source of electricity 102 could include other transport configurations to employ a centralized source of electricity that powers fracturing equipment.

FIG. 1 also illustrates that the switch gear transport 108 connects to an auxiliary power transport 120 with one medium voltage (e.g., 13.8 kV) cable connection 48. The auxiliary power transport 120 provides ancillary power for situations where the power source of electricity 102 is out of service or where peak electric power demand exceeds the electric power output of the power source of electricity 102.

The switch gear transport 108 also includes a transformer 112 that steps down electric power received at a medium voltage level (e.g., 13.8 kV) from the auxiliary power transport 120 and/or power source of electricity 102 to a low voltage level (e.g., 480 V, 240 V and 110 V). In one or more embodiments, the low voltage level (e.g., 480 V) connection may provide electric power to ignite or start the power source of electricity 102 and/or provide power to other fracturing equipment.

In one or more embodiments, the switch gear transport 108 may house a black start generator 30 to initiate and start the power source of electricity 102. Using FIG. 1 as an example, the black start generator 30 may provide electric power at 480 V. When the black start generator 30 generates electric power, the switch gear transport 108 supplies the electric power directly to the power source of electricity 102 using the low voltage level connection 47. In other examples, the black start generator 30 may provide electric power at voltage levels that exceed 480 V (e.g., 600 V, 2.1 kV, and 4.2 kV). In this situation, the switch gear transport 108 could include other transformers (112) to step down voltage from the black start generator 30 to a voltage level to start the power source of electricity 102.

As shown in FIG. 1, the switch gear transport 108 outputs and supplies medium voltage (e.g., 13.8 kV) with cable connections 45, 44 directly to the hydration-blender transport 106 and the fracturing pump transport 104 without connecting to any intermediate transports. FIG. 1 depicts that the switch gear transport 108 generates a total of seven medium voltage (e.g., 13.8 kV) cable connections 44, 45, where each fracturing pump transport 104 is directly connected to the switch gear transport 108 with a single medium voltage (e.g., 13.8 kV) cable connection 44. The switch gear transport 108 also directly connects to the hydration-blender transport 106 using a single medium voltage (e.g., 13.8 kV) cable connection 45. Additional transports can be connected to the switch gear transport 108 with a single medium voltage (e.g., 13.8 kV) cable connection, for example, up to a total of 24 for a single switch gear transport 108.

The medium voltage power distribution system shown in FIG. 1 is able to reduce the number of electrical cables used to supply electric power to the fracturing pump transport 104 and hydration-blender transport 106 when compared to other power distribution systems that provide power to the different transports at lower voltage levels (e.g., 4.2 kV, 600 V, and 480 V). As shown in FIG. 1, for instance, the fracturing fleet 103 reduces the number of electrical cables to one electrical cable 44 for each fracturing pump transport 104. A further reduction of electrical cables is shown by supplying one electrical cable 45 to the hydration-blender transport 106 instead of multiple electrical cables used to power a blender transport and a hydration transport.

One reason the medium voltage power distribution system is able to utilize less electrical cables is that each electrical cable 44, 45 does not need to supply a relatively high current (e.g., equal to or more than 600 A) to each fracturing pump transport 104 and hydration-blender transport 106. Supplying electric power at relatively lower current levels avoids the safety concerns and/or connection/disconnection issues associated with using a single electrical cable that supplies relatively high current (e.g., at 600 A); thereby, reducing the risk of harm and physical injuries to operators.

Each fracturing pump transport 104 may include one or more transformers 110, 112 to step down the voltage received from the switch gear transport 108 to different voltage levels. Using FIG. 1 as an example, each fracturing pump transport 104 may include two separate and independent transformers, a first transformer 110 to step down to a voltage level of 4.2 kV or 2.1 kV and a second transformer 112 to step down to a voltage level of 480 V, 240 V and 110 V.

In other examples, each fracturing pump transport 104 could include a single transformer 110 that produces multiple voltages levels. For example, the fracturing pump transport 104 may mount a three phase or three winding transformer 110 to step down the voltage to two different voltage levels. The 4.2 kV or 2.1 kV voltage level supplies electric power to one or more electric prime movers (not shown) that drive one or more pumps (not shown) and the 480 V, 240 V and 110 V supplies electric power to the drives and/or other control instrumentation mounted on the fracturing pump transport 104. Transformers 110 and 112 are able to supply enough electric current to power the prime movers, drivers, and/or other control instrumentation.

FIG. 1 also illustrates that the hydration-blender transport 106 includes a transformer 114 that steps down the voltage levels to 480 V, 240 V and 110 V. The hydration-blender transport 106 can use the stepped down voltages levels to provide electric power to the electric prime movers, drives, and/or other control instrumentation mounted on the hydration-blender transport 106. The hydration-blender transport 106 may also be configured to provide electric power at the 480 V, 240 V and 110 V voltage levels to other downstream fracturing equipment, such as the sand conveyor.

The medium voltage power distribution system may utilize one or more electrical connections to provide electric power to the sand conveyor, data van 114 and/or other fracturing equipment that utilize electric power. Although FIG. 1 illustrates that switch gear transport 108 provides electric power to the hydration-blender transport 106, other embodiments could have the switch gear transport 108 separately connect to a hydration transport and a blender transport. In such an embodiment, the switch gear transport 108 may connect to the hydration transport using a single medium voltage (e.g., 13.8 kV) cable connection and another single medium voltage (e.g., 13.8 kV) cable connection to connect to the blender transport.

By mounting the drives and transformers 110 and/or 112 onto the fracturing pump transport 104 and the transformer 114 on the hydration-blender transport 106, the transports 104, 106 become individually autonomous by removing the need for other separate support-based trailers, such as the auxiliary unit transport and drive power transports that provide power conversion and/or drive control. Having autonomous trailers allows the fracturing fleet 103 to become scalable and flexible, where each fracturing pump transport may be interchangeable with each other and allow for a reduced physical foot print of the fracturing fleet 103. For example, if the well is relatively small, the fracturing fleet 103 may have a reduced number of fracturing pump transports 104 (e.g., four transports instead of six transports). Conversely, if the well is large, more fracturing pump transports 104 can be stacked to increase pumping capacity without utilizing additional support-based transports.

In FIG. 1, the switch gear transport 108 receives electricity generated from the power source of electricity 102 at an input voltage level (e.g., 13.8 kV). After receiving the electric power, the switch gear transport 108 utilizes multiple circuit breakers 40 to distribute the electric power to one or more transports, such as fracturing pump transport 104 and hydration-blender transport 106. Each circuit breaker 40 could include electrical disconnects, switches, fuses, and/or circuit protectors to protect other fracturing equipment of fracturing fleet 103.

In one embodiment, the circuit breakers 40 are constructed to produce a target output voltage level that is about the same as the input voltage level. Each circuit breaker 40 may have a maximum current rated for powering one or more transports at the target output voltage level. For example, a circuit breaker 40 that provides electric power to two fracturing pump transports 104 can have a maximum current rating of about 500 A when each fracturing pump transport 104 is expected to utilize a maximum current of 250 A. In other words, the circuit breaker 40 can implement a 2:1 ratio regarding the number of fracturing pump transports 104 that receive electric power from the circuit breaker 40. Other embodiments could have different ratios where the circuit breaker provides electric power to a single transport (e.g., 1:1 ratio) or more than two transports (e.g., 3:1 or 4:1 ratio). The switch gear transport 108 is discussed in more detail with reference to FIGS. 2 and 3.

The switch gear transport 108 could also be setup to act as a hub for receiving control and monitoring information for fracturing fleet 103. Recall that cable connections 44, 45 could include fiber optics wires that allows the switch gear transport 108 to communicate, monitor, and provide control signals to other transports, such as fracturing pump transport 104 and hydration-blender transport 106. Specifically, the switch gear transport 108 could house control and monitoring equipment to communicate with other transports and fracturing equipment. For example, the switch gear transport 108 could include fiber optics, network translation tables, power measurements (e.g., voltage and current) and power management equipment (e.g., safety circuits and safety logic). The switch gear transport 108 could also provide data received from transports and fracturing equipment to data van 114. The data van 114 remotely controls the switch gear transport 108.

Although FIG. 1 illustrates a specific embodiment of a fracturing fleet 103 that utilizes electric power for operations, the disclosure is not limited to these particular embodiments. For instance, with reference to FIG. 1, the disclosure describes a switch gear transport 108 receiving electric power from a centralized power source of electricity 102 located at the well site 100. However, other embodiments could have the switch gear transport 108 receive electric power from other types of power sources, such as a power grid or a stationary power source. Additionally or alternatively, the fracturing fleet 103 shown in FIG. 1 may utilize a separate hydration transport and blender transport instead of a combined hydration-blender transport 106. Although not explicitly shown in FIG. 1, the switch gear transport 108 may also be able to power a second fracturing fleet located at an adjacent well site or for the purposes of fracturing multiple well heads 101. The use and discussion of FIG. 1 is only an example to facilitate ease of description and explanation.

Figure 2:
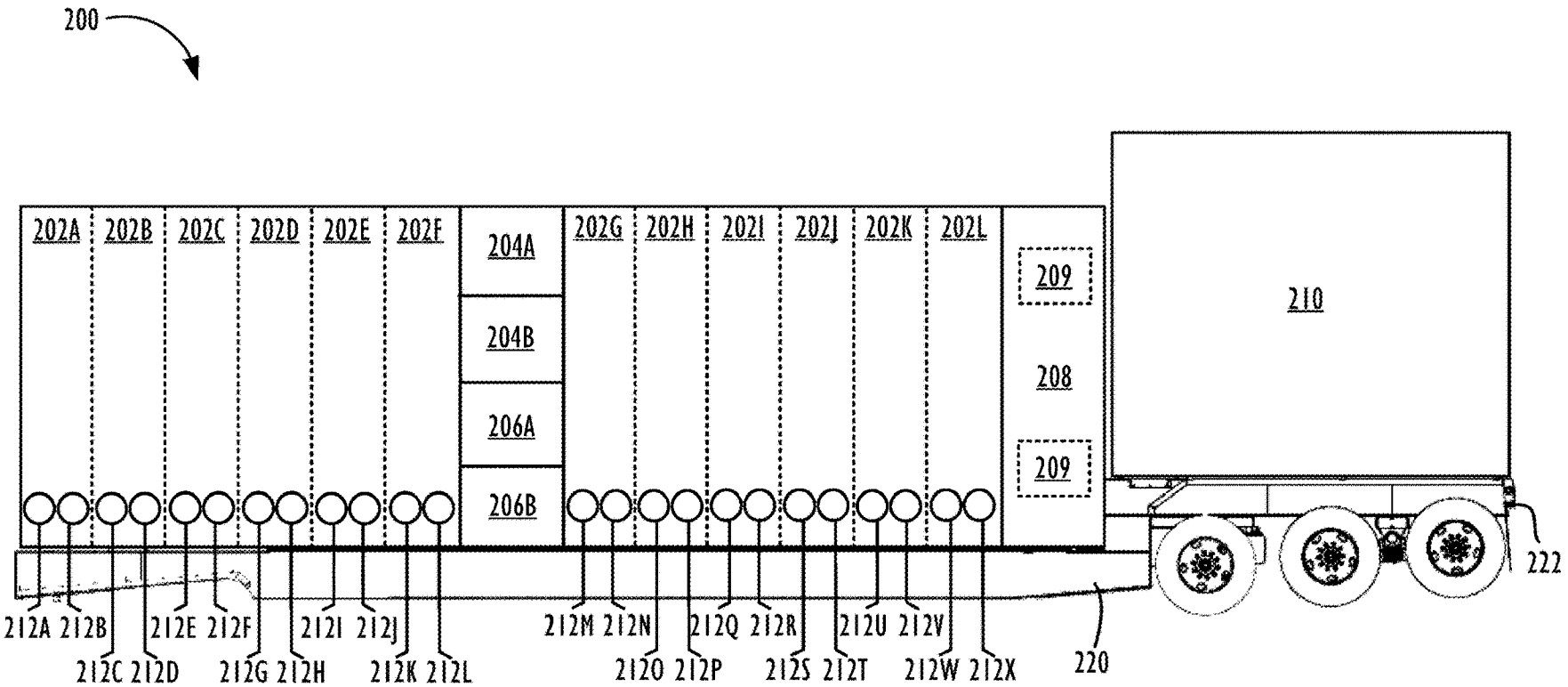
FIG. 2 is a schematic diagram of an embodiment of a switch gear transport.

FIG. 2 is a schematic diagram of an embodiment of a switch gear transport 200, such as the switch gear transport 108 shown in FIG. 1. As shown in the side-profile view, the switch gear transport 200 includes circuit breakers 202A-L, power source connections 204A and 204B, auxiliary power source connections 206A and 206B, power system 208, and black start generator 210. Within each of the circuit breakers 202A-L are circuit breaker connectors 212A-X that output and provide electric power to transports, such as a fracturing pump transport (104).

Each circuit breaker 202 may include multiple circuit breaker connectors 212 (e.g., two circuit breaker connectors 212). Using FIG. 2 as an example, circuit breaker 202A includes circuit breaker connectors 212A and 212B; circuit breaker 202B includes circuit breaker connectors 212C and 212D; circuit breaker 202C includes circuit breaker connectors 212E and 212F and so forth. Having each circuit breaker 202 include multiple connectors provides additional redundancy and/or the capability for the switch gear transport to distribute electric power to multiple fracturing fleets.

In one or more embodiments, the circuit breakers 202A-L are each rated to supply a maximum current rating that exceeds the sum of the maximum currents for two transports before tripping. For example, a circuit breaker that provides electric power to two fracturing pump transport can have a maximum current rating of about 500 A. In this situation, each fracturing pump transport could be expected to utilize a maximum current of 250 A. In other words, the circuit breaker 202 can implement a 2:1 ratio regarding the number of fracturing pump transports 104 that receive electric power from the circuit breaker. Other embodiments could have different ratios where the circuit breaker provides electric power to a single transport (e.g., 1:1 ratio) or more than two transports (e.g., 3:1 or 4:1 ratio).

Power source connections 204A and 204B represent input electrical connections that supply electric power for the switch gear transport 200 to distribute to one or more fracturing fleets. In one example, each power source connection 204A and 204B may be a single cable connection that connects to a power source of electricity capable of providing power to a single fracturing fleet. For example, the power source (e.g., 102; FIG. 1) of electricity may generate electric power in the ranges of about 15-40 megawatts (MW) at a voltage of about 13.8 kV. Typically, 30-40 MW of electric power is needed to power a fracturing fleet that includes about eight fracturing pump transports (104) and an electric blender transport (108).

Alternatively, each power source connection 204A and 204B may be implemented using multiple cable connections. Using FIG. 1 as an example, power source connection 204A represents the six medium voltage (e.g., 13.8 kV) cable connections between the power source of electricity 102 and switch gear transport 108. Having two power source connections 204A and 204B provides the switch gear transport 200 additional electric power to power two or more fracturing fleets (e.g., about 16 fracturing pump transports 104 and two or more electric blender transports 106).

To provide electric power to two fracturing fleets (103: FIG. 1), the switch gear transport 200 could also include auxiliary power source connections 206A and 206B. Each auxiliary power source connection 206A and 206B represents an input electrical connection to an auxiliary power transport (e.g., auxiliary power transport 120 shown in FIG. 1). Generally, an auxiliary power transport (120) includes a power source that produces less or a fraction of the electric power generated from the main power source of electricity (e.g., power source of electricity 102). Stated another way, the auxiliary power transport (120) is unable to generate enough electric power for an entire fracturing fleet.

As an example, an auxiliary power transport (120) is able to generate a total of about 1-8 MW of electric power). Recall that one of the functions for an auxiliary power transport (120) is to provide ancillary power for situations where the power source (e.g., 102) is out of service or where peak electric power demand temporarily exceeds the electric power output of the power source of electricity. Having two auxiliary power source connections 206A and 206B provides the switch gear transport 200 enough electric power to temporarily manage these electric power demands for at least two fracturing fleets.

FIG. 2 also illustrates that the switch gear transport 200 utilizes a lay-down trailer 220 to enhance mobility, improved safety, and enhance ergonomics for crew members when performing routine maintenance and connecting transports to circuit breaker connectors 212. The lay-down trailer 220 positions the circuit breakers 202 closer to the ground as the main trailer beams are resting on the ground in operational mode.

With the lay-down trailer design, the switch gear transport 200 has an upper section 222 above the trailer axles that could hold or have mounted the black start generator 210. For its part, the black start generator 210 may include a diesel generator or some other type of generator (turbine) powered by a hydrocarbon fuel (e.g., natural gas) to generate electric power to start or initiate the power source of electricity. For example, the black start generator 210 can generate electric power at a low voltage level (e.g., 480 V) to start the power source of electricity (e.g., 102; FIG. 1). In other examples, the black start generator 210 could generate electric power at a medium voltage level, which could be stepped down to a lower voltage level by a transformer 209 housed within power system 208.

As further shown in FIG. 2, the switch gear transport 200 includes a power system 208 that includes one or more transformers 209 to step one or more input voltages (e.g., 13.8 kV) to one or more lower voltages (e.g., 4.2 kV, 2.1 kV, 600 V, 480 V, 240 V, and 120 V). As an example, the power system 208 contains transformer 209 that steps down electric power from 13.8 kV to 480 V. Additionally or alternatively, the power system 208 could have transformers 209 that step down electric power to different voltage levels. In one example, if the black start generator 210 generates a voltage level that the power source of electricity is unable to utilize, the power system 208 could have a transformer 209 that converts electric power from the black start generator 210 to a proper voltage level. In another example, the power system 208 could also include transformers 209 that step down electric power to a relatively low voltage levels (e.g., 240 V and/or 120 V) that power electronic device (e.g., transport lights) operating on the switch gear transport 200.

Figure 3:
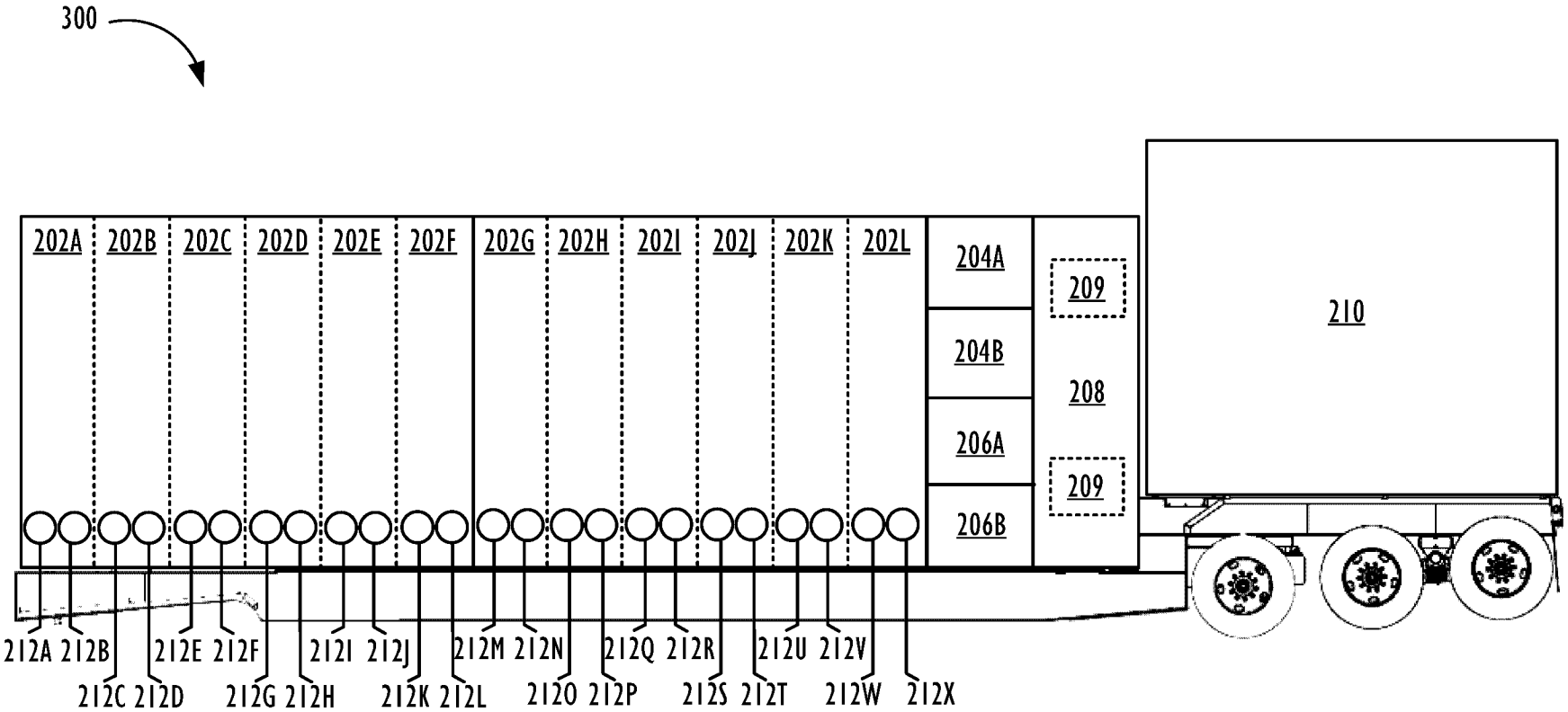
FIG. 3 is a schematic diagram of another embodiment of a switch gear transport.

FIG. 3 is a schematic diagram of another embodiment of a switch gear transport 300. Switch gear transport 300 is substantially similar to switch gear transport 200 except that the power source connections 204A and 204B and auxiliary power source connections 206A and 206B have moved been moved towards the rear of the switch gear transport 300. (For purposes of the disclosure, the rear of the switch gear transport references the section that is nearest to the trailer axles and the front of the switch gear transport references the section where a motorized vehicle could couple to the switch gear transport during transportation.)

As FIG. 3 shows, having the power source connections 204A and 204B and auxiliary power source connections 206A and 206B toward the rear of the switch gear transport 300 may alter how to manage and/or distribute the electric power to each of the circuit breakers 202A-L compared to the switch gear transport 200. Specifically, circuit breaker 202A is physically located farther away from the power source connections 204A and 204B and auxiliary power source connections 206A and 206B, and thus, may be susceptible to a relatively high parasitic resistance and/or noise that dissipates electric power. Physically locating the power source connections 204A and 204B and auxiliary power source connections 206A and 206B in between circuit breakers 202A-F and 202G-L as shown in FIG. 2, however, decreases the parasitic resistance and/or noise seen at circuit breaker 202A when compared to switch gear transport 300.

Figure 4:
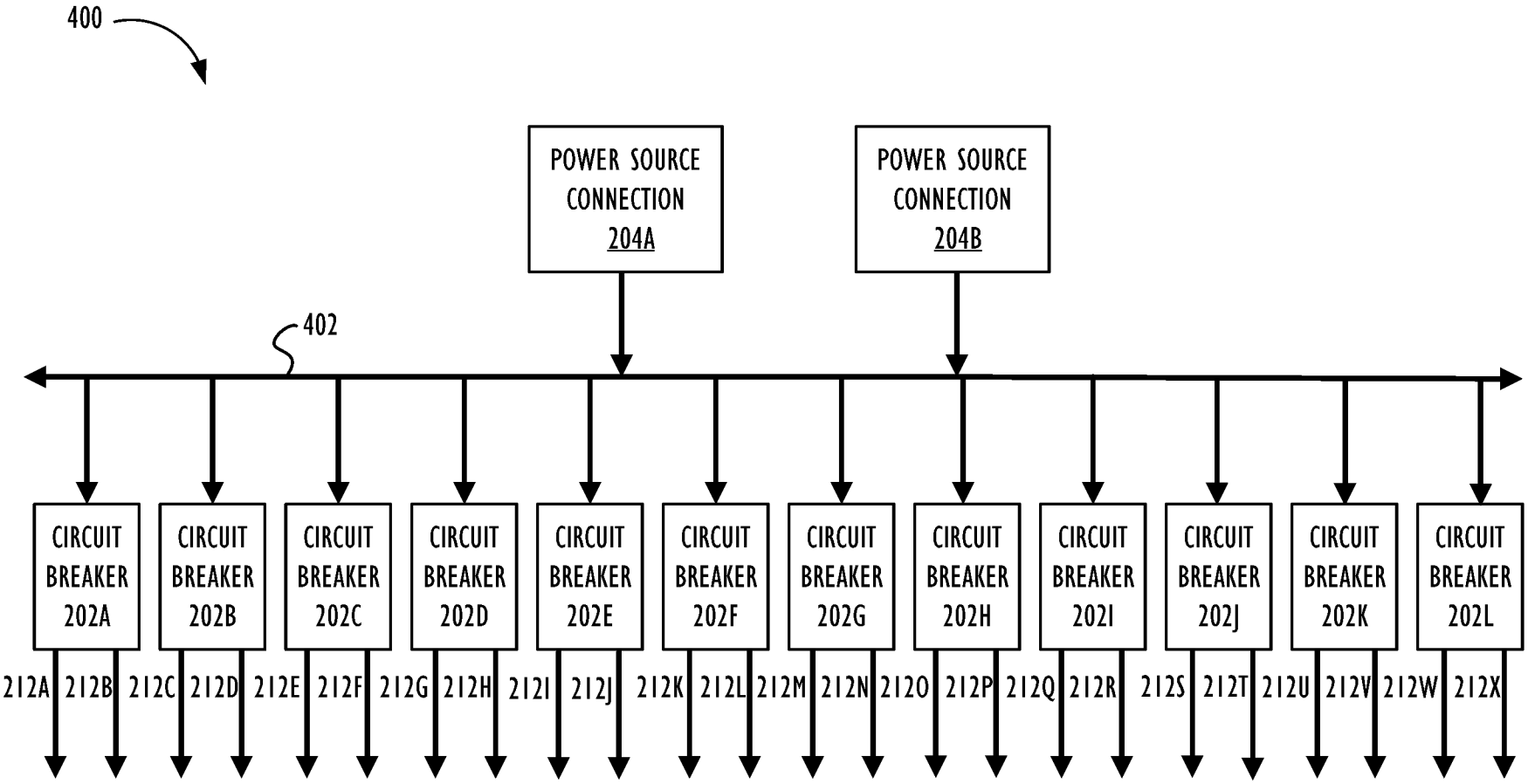
FIG. 4 is a block diagram of an embodiment of the power system for a switch gear transport.

FIG. 4 is a block diagram of an embodiment of the power system 400 for a switch gear transport. In FIG. 4, the power source connection 204A and power source connection 204B supply electric power to a main power bus 402. The main power bus 402 is capable of providing at least 60-80 MW of electric power to the circuit breakers 202A-L. In one or more embodiments, the main power bus 402 may include a positive voltage bus, a negative voltage bus, and a ground voltage bus (not shown in FIG. 4). The three different buses that form the main power bus 402 each couples to the circuit breakers 202A-L. Each circuit breaker 202A-L may be set to one of three states: an ON state, an OFF state, or a tripped state. When the circuit breakers 202A-L are in the ON state, the circuit breakers 202A-L are able to provide electric power to circuit breaker connectors 212A-X. When the circuit breakers 202A-L are in the OFF state, the circuit breakers 202A-L are disconnected from the main power bus 402 and does not to provide electric power to circuit breaker connectors 212A-X. The tripped state acts as a neutral state that prevents a circuit breaker 202 from supplying electric power to corresponding circuit breaker connectors 212 and also informs operators that an error has occurred within the switch gear transport.

Figure 5:
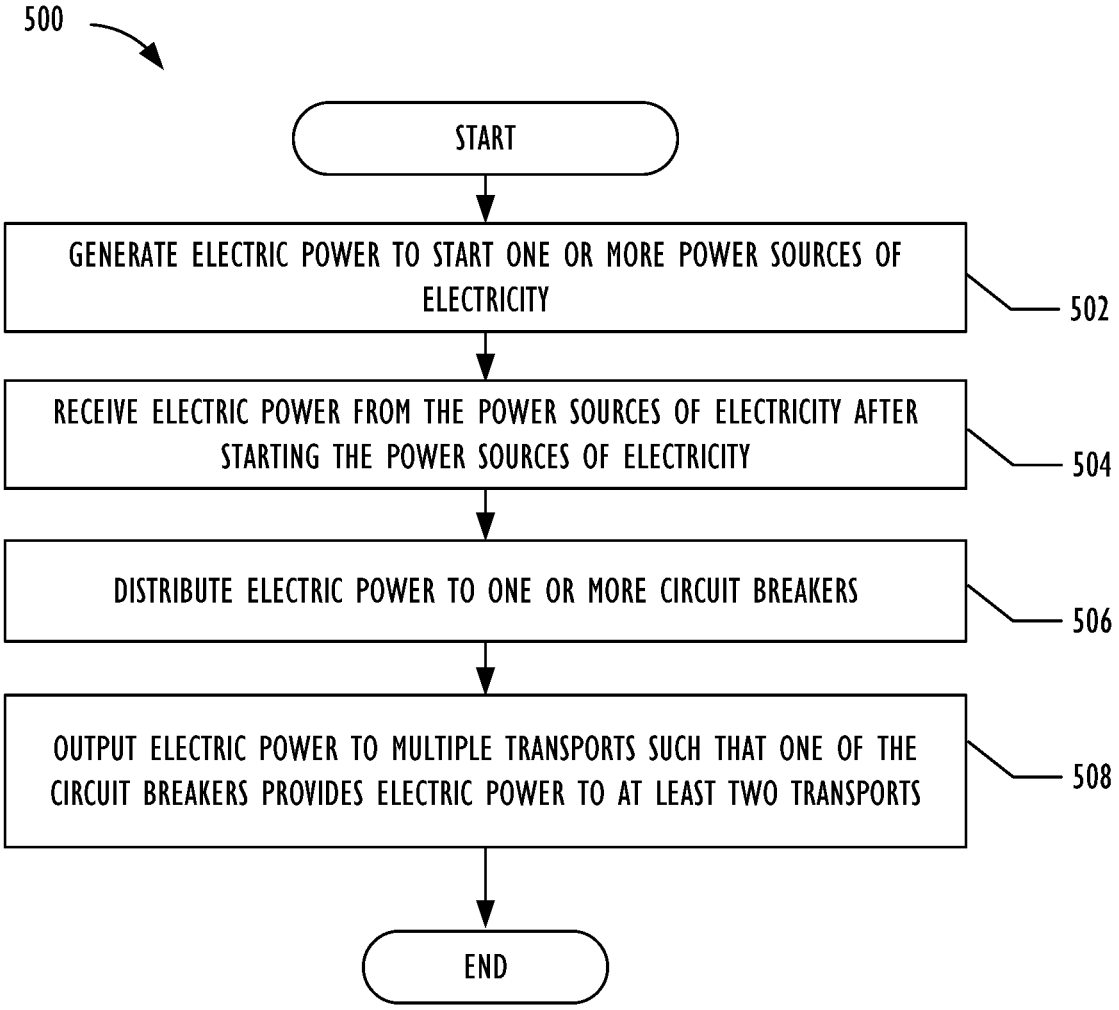
FIG. 5 is a flow chart of an embodiment of a method to manage and distribute electric power for a switch gear transport.

FIG. 5 is a flow chart of an embodiment of a method 500 to manage and distribute electric power for a switch gear transport. Method 500 may correspond to distributing electric power received from one or more power sources of electricity to one or more fracturing fleets. In particular, method 500 may implemented using switch gear transports 200 and 300 as shown in FIGS. 2 and 3. The use and discussion of FIG. 5 is only an example to facilitate explanation and is not intended to limit the disclosure to this specific example.

Method 500 may start at block 502 and generate electric power to start one or more power sources of electricity. In one embodiment, the power source of electricity can be a mobile power source that utilizes a gas turbine generator to generate electric power. To implement block 502, method 500 may utilize black start generator as referenced in FIG. 2. Method 500 may then move to block 504 and receive electric power from the power sources of electricity after starting the power sources of electricity. Using FIGS. 2 and 3 as an example, method 500 may receive electric power from power source connections 204A and 204B at an input voltage level of about 13.8 kV.

Method 500 continues to block 506 and distributes power to one or more circuit breakers. With reference to FIG. 4, method 500 may distribute electric power using main power bus 402. Afterwards, method 500 moves to block 508 and outputs electric power to multiple transport such that one of the circuit breakers provide electric power to at least two transports. Using FIG. 1 as an example, method 500 may have one of the circuit breakers in switch gear transport 108 supply electric power to two fracturing pump transport 104. In one or more embodiments, method 500 is able to provide electric power to both fracturing pump transports 104 using a single cable connection at a medium voltage level (e.g., 13.8 kV).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. An electric fracturing system powered by a power source of electricity, the system comprising:

a switch gear transport configured to: (i) electrically connect to the power source of electricity, (ii) receive first electric power from the power source of electricity at a first voltage level, and (iii) provide the first electric power at the first voltage level;

a first circuit breaker connector disposed on the switch gear transport and configured to supply the first electric power at the first voltage level;

*an auxiliary power transport configured to generate second electric power at a second voltage level that is equal to the first voltage level;*

*an auxiliary connector disposed on the switch gear transport and configured to receive the second electric power at the second voltage level from the auxiliary power transport;* a first transport electrically connected to the first circuit breaker connector via a first electrical cable and configured to receive the first electric power at the first voltage level via the first electrical cable; and a black start generator configured to electrically connect to the power source of electricity and being operable to supply [second] *third* electric power to start the power source of electricity, wherein the first transport comprises at least one first transformer configured to step down the first electric power received at the first voltage level to at least one [second] *third* voltage level, the at least one [second] *third* voltage level being less than *the* first voltage level.

2. The electric fracturing system of claim 1, wherein the first voltage level is within a range of 1000 V to 35 kilovolts, and wherein the at least one [second] *third* voltage level is less than 5 kilovolts.

3. The electric fracturing system of claim 1, further comprising a circuit breaker that is disposed on the switch gear transport and that comprises the first circuit breaker connector, or comprises both the first circuit breaker connector and a second circuit breaker connector.

4. The electric fracturing system of claim 3, wherein the second circuit breaker connector of the circuit breaker is configured to supply the first electric power at the first voltage level to a second transport.

5. The electric fracturing system of claim 4, wherein at least one of the first and second transports is a fracturing pump transport.

6. The electric fracturing system of claim 4, wherein at least one of the first and second transports is a hydration-blender transport.

7. The electric fracturing system of claim 1, wherein the black start generator is disposed on the switch gear transport and is configured to generate a [third] *fourth* voltage level to start the power source of electricity.

8. The electric fracturing system of claim 1, further comprising:

a power source connector disposed on the switch gear transport and configured to connect to the power source of electricity[; and].

[an auxiliary power source connector disposed on the switch gear transport and configured to connect to an auxiliary power source of electricity.]

[9. The electric fracturing system of claim 8, wherein the auxiliary power source of electricity is configured to generate third electric power at a fourth voltage level that is equal to the first voltage level.]

10. The electric fracturing system of claim [9] *1*, wherein the switch gear transport further comprises a second transformer configured to step down the [third] *second* electric power received at the [fourth] *second* voltage level from the auxiliary power [source of electricity] *transport* to a fifth voltage level, the fifth voltage level being less than the first voltage level.

11. The electric fracturing system of claim 10, further comprising a low voltage connector disposed on the switch gear transport and configured to provide the [third] *second* electric power [at] *stepped down by the second transformer to* the fifth voltage level to the power source of electricity to start the power source of electricity.

12. The electric fracturing system of claim 1, wherein the at least one first transformer comprises:

two or more of the at least one first transformer configured to step down the first electric power received at the first voltage level to two or more of the at least one [second] *third* voltage level different from one another; or one of the at least one first transformer configured to step down the first electric power received at the first voltage level to two or more of the at least one [second] *third* voltage level different from one another.

13. A switch gear transport used with a power source of electricity and one or more power consumers, the power source of electricity providing first electric power at a first voltage level, the transport comprising:

a power source connector configured to receive the first electric power from the power source of electricity at the first voltage level;

a plurality of circuit breakers electrically connected to the power source connector, each circuit breaker including at least one circuit breaker connector that is configured to output the first electric power to a corresponding one of the power consumers at the first voltage level;

a black start generator configured to electrically connect to the power source of electricity and being operable to generate second electric power at a second voltage level;

an auxiliary connector configured to receive third electric power at a third voltage level from an auxiliary power transport, the third voltage level being equal to the first voltage level; and a first transformer configured to convert the third electric power from the auxiliary power transport at the third voltage level to a fourth voltage level to start the power source of electricity.

14. The switch gear transport of claim 13, wherein the first voltage level is a target output voltage level of about 13.8 kilovolts, and wherein the switch gear transport further comprises another power source connector and wherein each of the power source connector and the other power source connector is configured to receive up to 40 megawatts of electric power.

15. The switch gear transport of claim 13, wherein the at least one circuit breaker connector allows a single cable connection between the switch gear transport and the corresponding one of the power consumers on a separate second transport.

16. The switch gear transport of claim 13, further comprising a low voltage connector configured to transmit the third electric power to the power source of electricity at the fourth voltage level.

17. The switch gear transport of claim 13, wherein each of the plurality of circuit breakers is rated to handle a maximum current that equals [to] or exceeds a total maximum current generated for operating the power consumers of two fracturing pump transports.

18. The switch gear transport of claim 13, wherein the second voltage level generated by the black start generator exceeds the fourth voltage level to start the power source of electricity; and wherein the transport further comprises a second transformer configured to step down the second voltage level from the black start generator to the fourth voltage level to start the power source of electricity.

19. The switch gear transport of claim 13, wherein the first transformer is further configured to step down the first electric power from the power source of electricity at the first voltage level to a fifth voltage level, the fifth voltage level being less than the first voltage level.

20. A method for distributing electric power from a power source of electricity to power fracturing operations, the method comprising:

receiving, at an auxiliary power source connector disposed on a switch gear transport, auxiliary electric power at a first voltage level;

converting, at a transformer disposed on the switch gear transport, the auxiliary electric power received at the first voltage level to a second voltage level to start the power source of electricity;

supplying, from the switch gear transport, the auxiliary electric power to the power source of electricity at the second voltage level;

receiving, at the switch gear transport, generated electric power from the power source of electricity at a third voltage level, wherein the third voltage level falls within a range of 1,000 V to 35 kilovolts;

supplying, from the switch gear transport, the generated electric power to a first power consumer transport at the third voltage level using only a first, single cable connection; and supplying, from the switch gear transport, the generated electric power to a second power consumer transport at the third voltage level using only a second, single cable connection.

21. The method of claim 20, wherein:

supplying, from the switch gear transport, the generated electric power to the first power consumer transport comprises supplying the generated electric power at the third voltage level from the switch gear transport to the first power consumer transport via a irst circuit breaker connector of a circuit breaker disposed on the switch gear transport, and supplying, from the switch gear transport, the generated electric power to the second power consumer transport comprises supplying the generated electric power at the third voltage level from the switch gear transport to the second power consumer transport via a second circuit breaker connector of the circuit breaker disposed on the switch gear transport.

*22. An electric fracturing system powered by a power source of electricity, the system comprising:*

*a switch gear transport configured to: (i) electrically connect to the power source of electricity, (ii) receive first electric power from the power source of electricity at a first voltage level, and (iii) provide the first electric power at the first voltage level;*

*an auxiliary power transport configured to generate second electric power at a second voltage level that is equal to the first voltage level;*

*a first circuit breaker connector disposed on the switch gear transport and configured to supply the first electric power at the first voltage level;*

*a first transformer configured to convert the second electric power received from the auxiliary power transport at the second voltage level to a third voltage level, and supply the second electric power at the third voltage level to start the power source of electricity;*

*a black start generator configured to electrically connect to the power source of electricity and being operable to supply electric power to start the power source of electricity;*

*a first transport electrically connected to the first circuit breaker connector via a first electrical cable and configured to receive the first electric power at the first voltage level via the first electrical cable; and*

*a data van configured to remotely control the switch gear transport via control signals, wherein the first electrical cable includes fiber optic wires to allow for communication of the control signals between the switch gear transport and the first transport.*

*23. The electric fracturing system of claim 22, wherein the fiber optic wires allow the switch gear transport to communicate, monitor and provide the control signals to the first transport.*

*24. The electric fracturing system of claim 22, wherein the switch gear transport provides data received from the first transport via the fiber optic wires of the first electrical cable to the data van.*

*25. The electric fracturing system of claim 22, wherein the switch gear transport is connected to the first transport via only the first electrical cable.*

*26. The electric fracturing system of claim 22, wherein the first voltage level is within a range of 1000 V to 35 kilovolts.*

*27. The electric fracturing system of claim 22, further comprising a circuit breaker that is disposed on the switch gear transport and that comprises the first circuit breaker connector, or comprises both the first circuit breaker connector and a second circuit breaker connector.*

*28. The electric fracturing system of claim 27, wherein the second circuit breaker connector of the circuit breaker is configured to supply the first electric power at the first voltage level to a second transport.*

*29. The electric fracturing system of claim 28, wherein at least one of the first and second transports is a fracturing pump transport.*

*30. The electric fracturing system of claim 28, wherein at least one of the first and second transports is a hydration-blender transport.*

*31. A switch gear transport used with a power source of electricity, the power source of electricity providing first electric power at a first voltage level, the switch gear transport comprising:*

*a power source connector configured to receive the first electric power at the first voltage level from the power source of electricity;*

*a plurality of circuit breakers electrically connected to the power source connector, wherein each circuit breaker includes at least one circuit breaker connector, the at least one circuit breaker connector being configured to output electric power to a power consumer at the first voltage level via a first electrical cable, wherein the first electrical cable includes fiber optic wires for communication of control signals;*

*an auxiliary connector configured to receive second electric power at a second voltage level from an auxiliary power transport, the second voltage level being equal to the first voltage level;*

*a first transformer configured to convert the second electric power from the auxiliary power transport at the second voltage level to a third voltage level to start the power source of electricity;*

*a black start generator configured to electrically connect to the power source of electricity and being operable to supply electric power to start the power source of electricity; and*

*control and monitoring equipment configured to communicate the control signals with the power consumer via the fiber optic wires,*

*wherein the switch gear transport is remotely controlled from a separate data van and wherein the switch gear transport is configured to provide data received via the fiber optic wires from the power consumer to the separate data van.*

*32. The switch gear transport of claim 31, wherein the fiber optic wires allow the switch gear transport to communicate, monitor and provide the control signals to the power consumer.*

*33. The switch gear transport of claim 31, wherein the switch gear transport is connectable to the power consumer via only the first electrical cable.*

*34. The switch gear transport of claim 31 wherein the first voltage level is within a range of 1000 V to 35 kilovolts.*

*35. A method for distributing electric power from a power source of electricity to power fracturing operations, the method comprising:*

*receiving, at a switch gear transport, electric power from the power source of electricity at a first voltage level, wherein the first voltage level falls within a range of 1,000 V to 35 kilovolts;*

*supplying, from the switch gear transport, the electric power to a downstream transport at the first voltage level using only a single cable connection, wherein the single cable connection includes fiber optic wires for communication of control signals to the downstream transport;*

*receiving, from a data van, remote-control signals for remotely controlling the switch gear transport;*

*supplying, from the switch gear transport and based on the remote-control signals, the control signals to the downstream transport via the fiber optic wires of the single cable connection;*

*receiving, at an auxiliary power source connector disposed on a switch gear transport, auxiliary electric power at a second voltage level; and*

*converting, at a transformer disposed on the switch gear transport, the auxiliary electric power received at the second voltage level to a third voltage level to start the power source of electricity.*

*36. The method of claim 35, further comprising providing to the data van data received from the downstream transport via the fiber optic wires of the single cable connection.*

*37. The method of claim 35, wherein the downstream transport is a fracturing pump transport.*

*38. The method of claim 35, wherein the downstream transport is a hydration-blender transport.*

* * * * *